US012596058B2

(12) United States Patent　　(10) Patent No.:　US 12,596,058 B2
Huber et al.　　(45) Date of Patent:　Apr. 7, 2026

(54) METHOD AND DEVICE FOR DETERMINING A SAMPLE STREAM CONCENTRATION VALUE OF AN ANALYTE IN A SAMPLE STREAM

(71) Applicant: TrueDyne Sensors AG, Reinach (CH)

(72) Inventors: Christof Huber, Bern (CH); Josua Ritter, Reinach (CH); Ragnar von Möllendorff, Grenzach-Wyhlen (DE); Johannes Bauer, Lörrach (DE)

(73) Assignee: TrueDyne Sensors AG, Reinach (CH)

( * ) Notice: Subject to any disclaimer, the term of this patent is extended or adjusted under 35 U.S.C. 154(b) by 293 days.

(21) Appl. No.: 18/551,743

(22) PCT Filed: Feb. 21, 2022

(86) PCT No.: PCT/EP2022/054261
　§ 371 (c)(1),
　(2) Date: Sep. 21, 2023

(87) PCT Pub. No.: WO2022/199961
　PCT Pub. Date: Sep. 29, 2022

(65) Prior Publication Data
　US 2024/0053234 A1　　Feb. 15, 2024

(30) Foreign Application Priority Data

Mar. 26, 2021　(DE) ..................... 10 2021 107 684.6

(51) Int. Cl.
　*G01N 1/20*　　　(2006.01)
　*G01N 1/38*　　　(2006.01)
(52) U.S. Cl.
　CPC ............. *G01N 1/2035* (2013.01); *G01N 1/38* (2013.01); *G01N 2001/383* (2013.01)

(58) Field of Classification Search
　CPC .. G01N 1/2035; G01N 1/38; G01N 2001/383; G01N 9/002; G01N 9/36; G01N 33/18
　See application file for complete search history.

(56) References Cited

U.S. PATENT DOCUMENTS 5,423,228 A * 6/1995 Budd ................... G01N 1/2258
　　　　　　　　　　　　　　　　　　　　73/863.81
10,684,153 B2 * 6/2020 Wheeler .................. G01F 1/86
　　　　　　　　(Continued)

FOREIGN PATENT DOCUMENTS

DE　　　　3622669 A1　　3/1987
DE　　　　9307216 U1　　7/1993
　　　　　　(Continued)

*Primary Examiner* — David Z Huang
(74) *Attorney, Agent, or Firm* — Mark A. Logan; Endress+Hauser (USA) Holding, Inc.

(57)　　　　　　ABSTRACT

A method for determining a concentration of an analyte in a sample stream containing the analyte and a solvent includes: preparing a measured stream by diluting the sample stream with a solvent stream; ascertaining a concentration of the analyte in the measured stream; and ascertaining the concentration of the analyte in the sample stream as a function of the measured stream concentration and a dilution ratio of sample stream and measured stream. An apparatus of the invention includes: a first Coriolis mass flow measuring device for measuring a solvent stream as a function of the sample stream for diluting the sample stream; a second Coriolis device for ascertaining a mass flow of the measured stream; a density measuring device for ascertaining a density of the measured stream; and a computing and operating unit for computing the concentration of the analyte in the sample stream.

8 Claims, 2 Drawing Sheets

<u>100</u>

(56)                    References Cited

U.S. PATENT DOCUMENTS

| | | | |
|---|---|---|---|
| 2011/0077144 A1* | 3/2011 | Jessen .................... | B01J 49/53 |
| | | | 502/25 |
| 2021/0080446 A1 | 3/2021 | Ahmed et al. | |

FOREIGN PATENT DOCUMENTS

| | | | |
|---|---|---|---|
| DE | 19737156 | A1 | 3/1999 |
| DE | 102004018326 | A1 | 11/2005 |
| DE | 102016119468 | A1 | 6/2017 |
| DE | 102018127688 | A1 | 5/2020 |
| DE | 102019123874 | A1 | 3/2021 |
| EP | 3225971 | A1 | 10/2017 |

* cited by examiner

METHOD AND DEVICE FOR DETERMINING A SAMPLE STREAM CONCENTRATION VALUE OF AN ANALYTE IN A SAMPLE STREAM

CROSS-REFERENCE TO RELATED APPLICATIONS

The present application is related to and claims the priority benefit of German Patent Application No. 10 2021 107 684.6, filed on Mar. 26, 2021 and International Patent Application No. PCT/EP2022/054261, filed on Feb. 21, 2022, the entire contents of which are incorporated herein by reference.

TECHNICAL FIELD

The invention relates to a method for continuous determination of a sample stream concentration value of an analyte in a sample stream containing an analyte in a solvent.

BACKGROUND

Especially when the analyte has a concentration near the saturation concentration, it can leave the solvent and deposit on surfaces of measuring devices, such that the concentration measurement is degraded. Such is the case, for example, for highly concentrated brines, for example, table salt solutions, where basically density measurement with vibronic sensors is suitable for determining concentration. When sodium chloride deposits on sensor surfaces, this corrupts the density measurement and therewith the determining of concentration.

SUMMARY

It is, therefore, an object of the invention to provide a remedy for this problem.

The object is achieved according to the invention by the method and by the apparatus as claimed in the present disclosure.

The method of the invention serves, especially, for continuous determination of a sample stream concentration value of an analyte in a sample stream containing the analyte and a solvent, wherein the method comprises method steps as follows:

preparing a measured stream by diluting the sample stream with a solvent stream;

ascertaining a measured stream concentration value of the analyte in the measured stream; and ascertaining the sample stream concentration value of the analyte in the sample stream as a function of the measured stream concentration value and a dilution ratio of sample stream and measured stream.

In a further development of the invention, the ascertaining of the measured stream concentration value comprises registering a measured variable, which depends on concentration of the analyte in the measured stream. In an embodiment of this further development of the invention, the measured variable comprises density of the measured stream.

In a further development of the invention, the dilution ratio is ascertained based on a mass flow rate measured value of the solvent stream and a mass flow rate measured value of the measured stream.

In a further development of the invention, the dilution ratio is controlled to a constant value.

In a further development of the invention, the dilution ratio is controlled by controlling the mass flow rate measured value of the solvent stream to provide a constant ratio of the mass flow rate measured value of the solvent stream to the mass flow rate measured value of the measured stream, wherein the ratio amounts to no more than ½, for example, no more than ¼, and, especially, no more than ⅕.

In a further development of the invention, the analyte comprises a salt, especially NaCl.

In a further development of the invention, the solvent comprises an aqueous medium, especially water.

In a further development of the invention, a density measured value for density of the measured stream is ascertained by means of a vibronic sensor based on at least one oscillation frequency of the vibronic sensor.

In a further development of the invention, the measured stream is discarded after registering the measured variable and determining the mass flow rate measured value of the measured stream.

In a further development of the invention, the sample stream is taken from a process media stream, whose mass flow rate amounts to not less than a hundredfold, especially not less than a thousandfold, of the mass flow rate of the sample stream, wherein the sample stream concentration value is output as process media concentration value.

In a further development of the invention, the sample stream has a concentration of the analyte, which subceeds a saturation concentration of the analyte in the solvent by no more than 4% of the saturation concentration and, especially, no more than 2% of the saturation concentration.

In a further development of the invention, the measured stream has a concentration of the analyte, which subceeds a saturation concentration of the analyte in the solvent by not less than 8% of the saturation concentration and, especially, not less than 12% of the saturation concentration.

The apparatus of the invention for determining a sample stream concentration value of an analyte in a sample stream containing the analyte and a solvent, especially an apparatus operating according to at least one of the above versions of the method of the invention, comprises:

a first Coriolis mass flow measuring device, which is adapted for controlling a solvent stream as a function of the sample stream for diluting the sample stream to form a measured stream;

a second Coriolis mass flow measuring device, which is adapted for ascertaining a mass flow measured value of the measured stream;

a density measuring device for ascertaining a density measured value of the measured stream; and a computing- and operating unit, which is adapted for computing the concentration of the analyte in the sample stream.

In an additional development of the invention, the apparatus further comprises a mass flow controller for controlling the solvent stream, wherein the mass flow controller is adapted to control the solvent stream to a desired value, which depends on the mass flow measured value of the measured stream, wherein the first Coriolis mass flow measuring device is adapted to provide the mass flow controller with an actual value of the solvent stream.

BRIEF DESCRIPTION OF THE DRAWINGS

The invention will now be explained in greater detail based on an example of an embodiment shown in the drawing.

The figures of the drawing show as follows.

DETAILED DESCRIPTION

Figure 1:
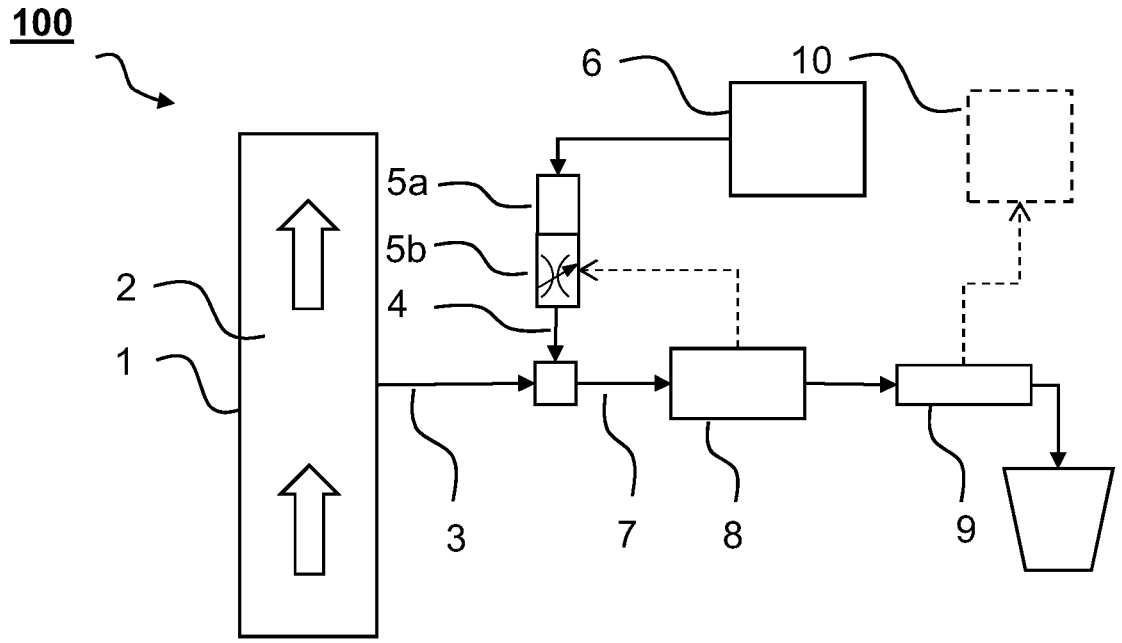
FIG. 1 shows a schematic view of an example of an embodiment of an apparatus of the present disclosure for performing the method of the present disclosure.

The apparatus 100 shown in FIG. 1 includes a pipeline 1, through which a mass flow 2 of a process medium, for example, a brine, flows. The process medium contains an analyte in a solvent, for example, thus, sodium chloride in water, wherein the concentration ($X_3$) of the analyte is to be determined. A high concentration is desired for the process, in the ideal case the saturation concentration, which is to be verified by measurement. In such case, however, the analyte can come out of solution and, as a result, corrupt the measuring and in the extreme case plug the measuring arrangement. In order to determine concentration, consequently, according to the invention, a sample stream 3, which amounts, for example, to less than 0.1% of the mass flow of the process medium, is diverted and diluted in a constant ratio by supply of a solvent stream 4 from a reservoir 6, in order to prepare a measured stream 7, whose analyte concentration lies well below the saturation concentration.

The reservoir can in the simplest case comprise a water line, wherein the static pressure of the solvent stream 4 is kept higher than that of the sample stream 3.

In order to achieve a constant dilution ratio, a mass flow rate measured value ($\dot{m}_7$) of the measured stream 7 is determined by a Coriolis mass flow measuring device 8. The mass flow rate measured value ($\dot{m}_7$) is preferably fed to a mass flow controller (flow controller) 5b having a controllable throttle and receiving an actual value of the solvent stream 4 from an upstream-situated Coriolis mass flow measuring device 5a and adapted by means of the throttle to control a mass flow rate measured value ($\dot{m}_4$) of the solvent stream 4 such that a constant ratio R of the mass flow rate measured value ($\dot{m}_4$) of the solvent stream 4 to the mass flow rate measured value ($\dot{m}_7$) of the measured stream results, thus:

$$\dot{m}_4 = \dot{m}_7 \cdot R = (\dot{m}_3 + \dot{m}_4) \cdot R$$

From this there holds for the ratio of the mass flow rate ($\dot{m}_3$) of the sample mass stream 3 and the mass flow rate ($\dot{m}_4$) of the solvent stream 4:

$$\dot{m}_3 = \dot{m}_4 \frac{1-R}{R}$$

The concentration of the analyte $X_3$ in the sample stream 3 can, consequently, be determined based on the concentration $X_7$ of the analyte in the measured stream 7 according to:

$$x_3 = x_7 \cdot \frac{\dot{m}_4 \frac{1-R}{R} + \dot{m}_4}{\dot{m}_4 \frac{1-R}{R}} = x_7 \cdot \frac{1}{1-R}$$

For determining the concentration, a density measured value of the measured stream 7 is ascertained either with the Coriolis mass flow measuring device 8 or a following, vibronic, micromechanical densimeter 9, and a temperature measured value of the measured stream 7 is registered, wherein the temperature sensor is integrated in the densimeter 9. The measured stream concentration value $X_7$ is calculated as a function of the density measured value and the measured value of temperature. After registering the density measured value p of the measured stream 7, the measured stream is discarded. The calculating of the measured stream concentration value $X_7$, and the sample stream concentration value $X_3$, can be performed by an integrated computer unit of the densimeter 9 or by an, in given cases, present, separate computer unit 10, to which are fed the required measured values for density and temperature.

It is not absolutely required that a constant dilution ratio R be used. It is, however, required that the dilution ratio be known exactly. In this regard, it suffices that the first Coriolis mass flow measuring device 5a be present for registering the solvent stream and the second Coriolis mass flow measuring device 8 be present for registering the measured stream 7. An uncontrolled dilution ratio R of the right order of magnitude can be obtained using a constant or selectable throttling in the solvent stream.

Especially the use of a micromechanical densimeter and Coriolis mass flow measuring devices with nominal diameters of 1 mm and less enables continuous determining of concentration with minimum sample amounts, such that the discarding of the measured stream is insignificant. Thus, the required measurement accuracies for the mass flow rates at nominal diameter DN1 are directly achievable with flow rates from 0.6 kg/h to 6 kg/h. At DN0.4, flow rates of 0.06 kg/h to 0.6 kg/h suffice.

In the present example, the apparatus is operated, for example, with R=20% for determining concentration of a brine. This leads for the concentration of table salt in the sample stream to:

$$x_{3,NaCl} = x_{7,NaCl} \cdot 1.25$$

The concentration of the analyte in the measured stream amounts to four fifths of the concentration in the sample stream and has therewith a sufficient separation from the saturation concentration, such that a leaving of the analyte (here sodium chloride) from solution is reliably prevented.

Figure 2:
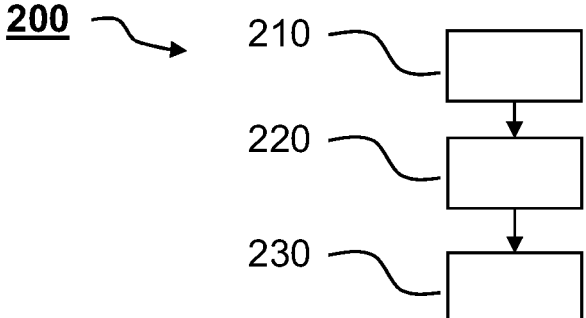
FIG. 2 shows a flow diagram of an example of an embodiment of the method of the present disclosure.

The essential steps of the method of the invention will now be summarized with reference to FIG. 2. Thus, the method (200) for determining a sample stream concentration value ($X_3$) of an analyte in a sample stream containing the analyte and a solvent begins with preparing (210) a measured stream by diluting the sample stream with a solvent stream. In this way, it is assured that the concentration of the analyte in the measured stream lies significantly below the saturation concentration of the analyte, and a dropping of the analyte from solution can not corrupt the measuring. In the next step, there occurs the ascertaining (220) of a measured stream concentration value ($X_7$) of the analyte in the measured stream, this being performed essentially based on density measurement. Finally, the sample stream concentration value ($X_3$) of the analyte in the sample stream is ascertained (230) by calculation using the measured stream concentration value ($X_7$) and the dilution ratio (R) between sample stream (3) and measured stream (7).

Figure 3:
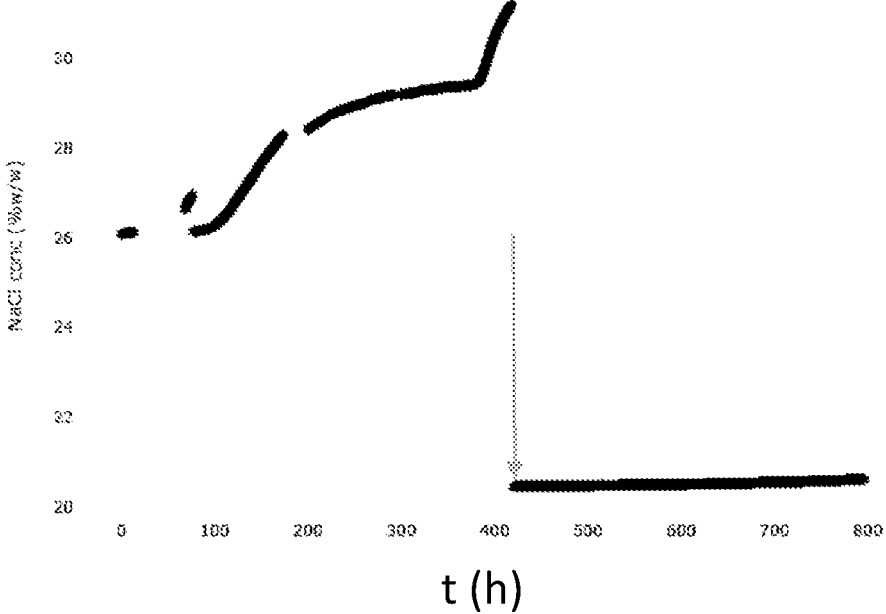
FIG. 3 shows measurement data for measured value stability of the method of the present disclosure.

FIG. 3 shows concentration measurements for an undiluted sample stream out to t=420 h with, for instance, 26.1 mass-% salt based on density measurements on a brine having a constant saturation concentration. The illustration erroneously shows the concentration out to t=420 h to be increasing. This happened as a result of salt depositing on the oscillator and, thus, increasing the mass of the oscillator, such that the measurement was corrupted. After 420 hours, in contrast, a dilution of R=22% was used. The new measurement data shows the concentration of the salt in the measured stream at a constant 20.4 mass-%. Conversion according to $$x_3 = x_7 \cdot \frac{1}{1-R}$$

gives a concentration of 26.15 mass-% for the undiluted sample stream. This provides a clear improvement of accuracy of measurement and measured value stability compared to the state of the art.

The invention claimed is:

1. A method for determining a concentration of an analyte in a sample stream containing the analyte and a solvent, wherein the sample stream has a concentration of the analyte that subceeds a saturation concentration of the analyte in the solvent by no more than 4% of the saturation concentration, the method comprising:

preparing a measured stream by diluting the sample stream with a solvent stream, wherein the measured stream thereby has a concentration of the analyte that subceeds the saturation concentration of the analyte in the solvent by not less than 8% of the saturation concentration;

determining a measured stream concentration value of the analyte in the measured stream by determining a density of the measured stream that depends on a concentration of the analyte in the measured stream, wherein the density of the measured stream is determined via a vibronic sensor based on at least one oscillation frequency of the vibronic sensor; and determining the concentration of the analyte in the sample stream as a function of the measured stream concentration value and a dilution ratio of the sample stream and the measured stream.

2. The method as claimed in claim 1, wherein the dilution ratio is ascertained based on a mass flow rate measured value of the solvent stream and a mass flow rate measured value of the measured stream.

3. The method as claimed in claim 2, further comprising: controlling the dilution ratio to a constant value.

4. The method as claimed in claim 3, wherein the dilution ratio is controlled by controlling the mass flow rate measured value of the solvent stream to provide a constant ratio of the mass flow rate measured value of the solvent stream to the mass flow rate measured value of the measured stream, wherein the ratio amounts to no more than ½.

5. The method as claimed in claim 2, further comprising: discarding the measured stream after registering the measured variable and determining the mass flow rate measured value of the measured stream.

6. The method as claimed in claim 1, wherein the analyte includes a salt.

7. The method as claimed in claim 1, wherein the solvent includes an aqueous medium.

8. The method as claimed in claim 1, wherein the sample stream is taken from a process media stream having a mass flow rate not less than a hundredfold of a mass flow rate of the sample stream, wherein the sample stream concentration value is output as a process media concentration value.

\* \* \* \* \*